Sept. 16, 1930.  V. G. APPLE  1,775,633
DYNAMO ELECTRIC MACHINE ARMATURE
Filed June 28, 1927   5 Sheets-Sheet 1
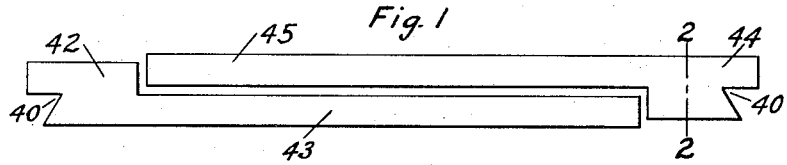
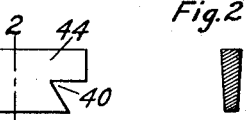
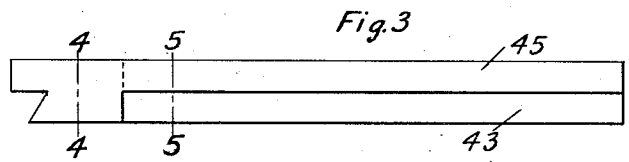
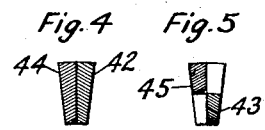
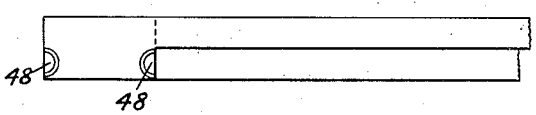
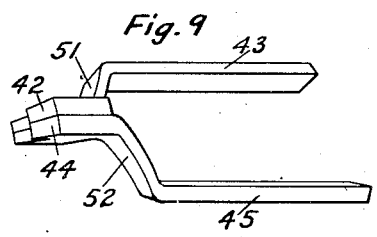
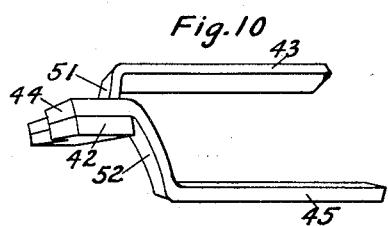
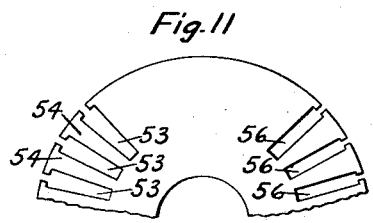
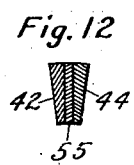
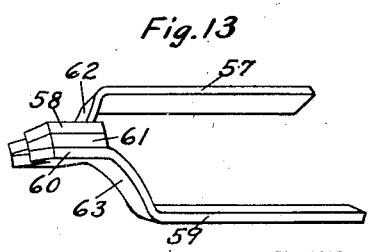
INVENTOR
Vincent G. Apple Sept. 16, 1930.　　　　V. G. APPLE　　　　1,775,633
DYNAMO ELECTRIC MACHINE ARMATURE
Filed June 28, 1927　　　5 Sheets-Sheet 2

INVENTOR
Vincent F. Apple

Sept. 16, 1930.   V. G. APPLE   1,775,633
DYNAMO ELECTRIC MACHINE ARMATURE
Filed June 28, 1927   5 Sheets-Sheet 3

INVENTOR
Vincent F. Apple

Sept. 16, 1930. V. G. APPLE 1,775,633
DYNAMO ELECTRIC MACHINE ARMATURE
Filed June 28, 1927   5 Sheets-Sheet 4
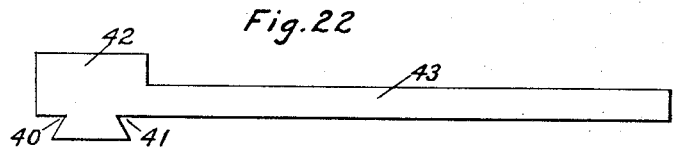
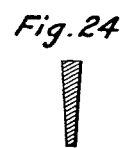
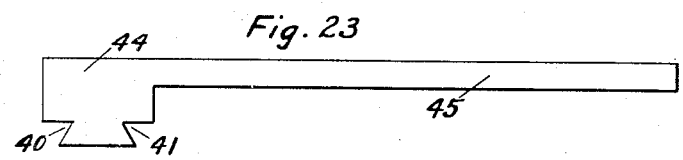
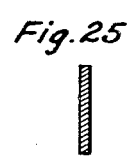
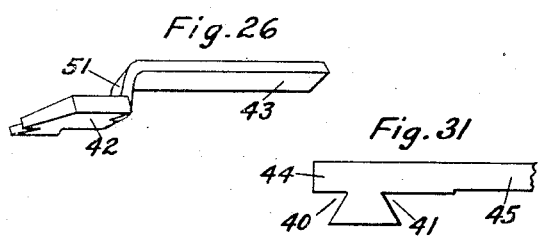
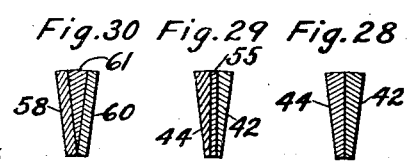
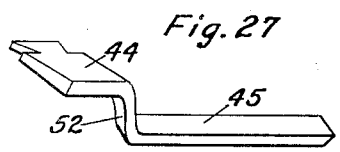
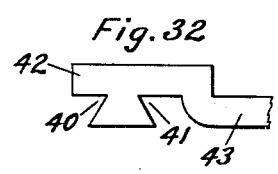
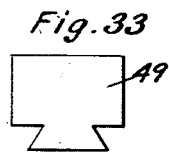
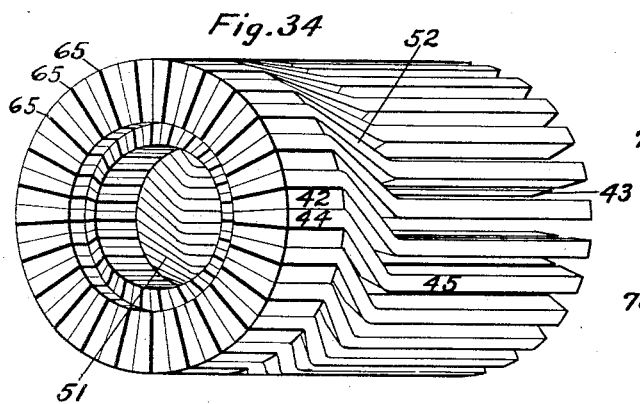
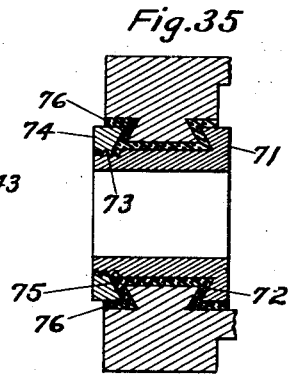
INVENTOR
Vincent G. Apple Sept. 16, 1930.  V. G. APPLE  1,775,633
DYNAMO ELECTRIC MACHINE ARMATURE
Filed June 28, 1927  5 Sheets-Sheet 5
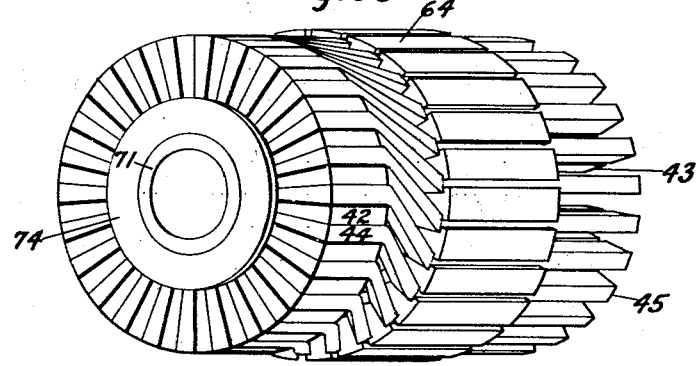
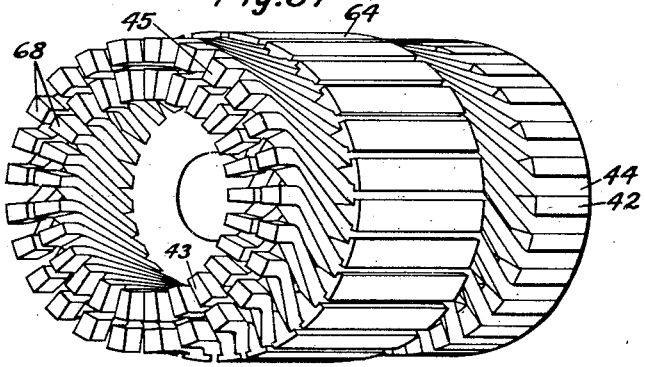
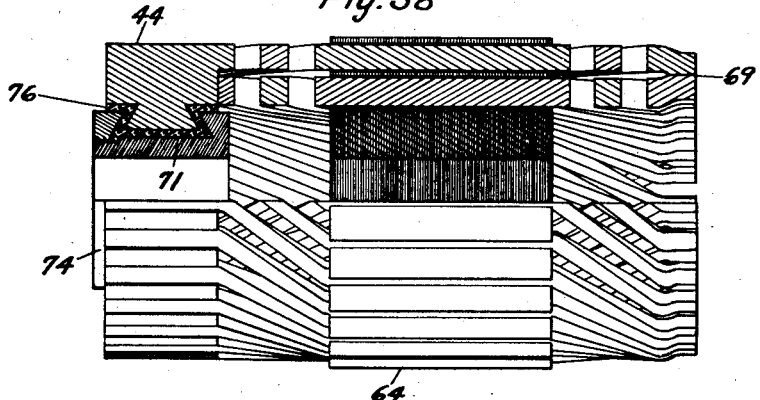
INVENTOR
Vincent G. Apple Patented Sept. 16, 1930

1,775,633

UNITED STATES PATENT OFFICE

VINCENT G. APPLE, OF DAYTON, OHIO

DYNAMO-ELECTRIC-MACHINE ARMATURE

Application filed June 28, 1927. Serial No. 202,139.

My invention relates to improvements in that type of armature which comprises a core, a bar winding and a commutator, and the objects of my improvements are, first, to provide a structure wherein the commutator is an integral part of the winding; second, to provide details of construction whereby the stock from which the winding bars are made is used with minimum waste; third, to provide details of construction in the winding units which may be varied to suit core slots of different shapes and proportions; and fourth, to produce an article that is more durable and dependable and of better appearance than when made by present methods.

Further objects will be apparent from the detailed description when reference is made to the drawings, wherein—

Fig. 1 shows how a length of bar stock may be notched and cut apart so that each part comprises a commutator lug and a conductor bar.

Fig. 2 is a cross section taken at 2—2 of Fig. 1.

Fig. 3 shows how the two parts shown in Fig. 1 are reassembled.

Fig. 4 is a cross section taken at 4—4 of Fig. 3.

Fig. 5 is a cross section taken at 5—5 of Fig. 3.

Fig. 6 is an end view of Fig. 7.

Fig. 7 shows how the notching shown in Fig. 1 may be eliminated by substituting spot welding.

Fig. 8 is an outline of a pad which may be added to the commutator lugs to provide a segment of the desired thickness.

Fig. 9 is a perspective view of one unit of my winding after the conductor legs are spread apart.

Fig. 10 is another way of assembling the parts shown in Fig. 9.

Fig. 11 shows two different types of core slots used in common practice.

Fig. 12 shows how a composite commutator segment may be thickened by adding a shim or pad thereto.

Fig. 13 is a perspective view of a winding unit wherein the cross section of the conductor bars is rectangular and the cross section through the commutator segment is wedge shaped.

Fig. 14 is a cross section taken through a composite commutator segment such as is shown in Fig. 13.

Figs. 22 and 23 show how a pair of bars may be formed when a means other than the moulding process is to be employed to bind the segments together to compose a commutator.

Fig. 24 is a cross section taken through a length of wedge shaped bar stock from which parts Figs. 22 and 23 are taken when they are to be used in a core having wedge shaped slots.

Fig. 25 is a cross section taken through a length of rectangular bar stock from which parts Figs. 22 and 23 may be taken when they are to be used in a core having rectangular slots.

Figs. 26 and 27 show the bars Figs. 22 and 23 respectively after they are bent in a manner to compose a turn of the winding.

Fig. 28 is a cross section through a commutator segment which has been formed by placing the lugs of bars Figs. 26 and 27 circumferentially adjacent in the winding, the bars Figs. 26 and 27 having been cut from stock such as is shown in Fig. 24.

Fig. 29 shows how a pad of uniform thickness may be placed between the lugs shown in Fig. 28 when the composite thickness or the composite contour of the two lugs is not suitable for a segment of a commutator of the desired diameter.

Fig. 30 shows how a pad of wedge shaped cross section may be placed between the lugs to provide a commutator segment of the desired shape and size when the bars Figs. 22 and 23 have been taken from bar stock as shown in Fig. 25 or from flat sheet stock.

Figs. 31 and 32 show how the relatively narrower bar stock shown in Fig. 2 may be cut apart and notched to provide a result similar to that shown in Figs. 22 and 23 with less waste of stock.

Fig. 33 shows the outline to which a pad may be cut when used as shown in Figs. 29 and 30.

Fig. 34 shows a complete set of bars such as are shown in Figs. 26 and 27 assembled in cylindrical formation ready to have a commutator binding means applied.

Fig. 35 is a cross section taken through the commutator of my armature after a form of binding means is applied.

Fig. 36 shows a structure formed by joining a set of bars as shown in Fig. 34 by a means as shown in Fig. 35 and then entering them into the slots of a core.

Fig. 37 shows how the free ends which project beyond the core in Fig. 36 may be bent and brought together in pairs so that they may be joined to complete the circuit.

Fig. 38 shows a complete armature partly in section, the bent and brought together ends of Fig. 37 having been welded to complete the circuit.

Similar numerals refer to similar parts throughout the drawings.

Figure 15:
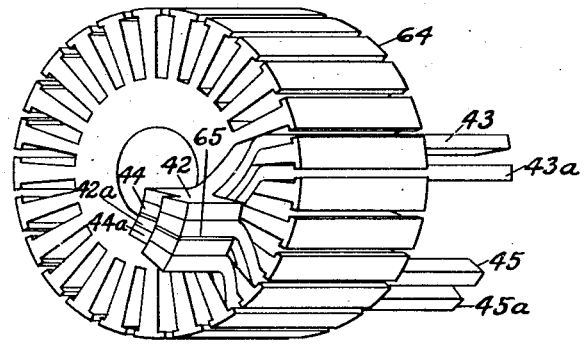
Fig. 15 shows two of my improved winding units assembled with an armature core.

For clearness in the following description a conductor bar so located relative to the commutator lug as to occupy a position in the outer layer of the completed winding may be referred to as an outer conductor bar and a conductor bar so located as to occupy a position in the inner layer may be referred to as an inner conductor bar.

In Fig. 1 a length of bar stock, preferably copper, has been notched as at 40 and 40 and separated into two parts, the one part comprising a commutator lug 42 and the inner conductor bar 43, the other part comprising a commutator lug 44 and an outer conductor bar 45.

In Fig. 2 I show a cross section through a length of bar stock suitable for making the parts shown in Fig. 1, and it will be seen that the sides of the bar are inclined towards each other, forming what is commonly called a wedge shaped cross section. Bar stock of this form is readily obtainable, as it is commercially produced in varying wedge angles for use in making commutators of the conventional type.

After the length of stock has been separated as shown in Fig. 1 the one part may be turned end for end and the two commutator lugs 42 and 44 placed side by side leaving the two conductor bars 43 and 45 extend parallel to each other, although not in the same plane, the cross section Fig. 4 showing how the lugs 42 and 44 thus form a composite outline suitable for a commutator segment and the cross section Fig. 5 showing the relative position of the conductor bars 43 and 45.

In Figs. 6 and 7 I show another length of bar stock which has been cut apart in the same manner as that shown in Fig. 1, but which has not been notched at the ends as at 40 and 40. After the one part has been turned end for end and laid alongside the other part, the two commutator lugs 46 and 47 are spot welded together, and the welding bits are allowed to make deep depressions, as at 48, 48, etc., into which a commutator segment holding means consisting of moulded insulating material may afterwards extend to bind the segments together into a commutator.

In Fig. 9 I show the two parts of a winding unit with commutator lugs 42 and 44 placed adjacent to each other and the inner conductor bar 43 displaced in one direction and positioned to occupy the inner half of a core slot and the outer conductor bar 45 displaced in the other direction and positioned to occupy the outer half of another core slot. The conductor bars may be displaced equal amounts from their commutator lugs or they may be displaced the one more than the other, so long as the total spread between a bar 43 and a bar 45 is sufficient to compose a turn of the winding which is usually about one pole pitch. The lugs 42 and 44 may be brazed, welded or otherwise joined together either before or after the conductor bars are spread apart, or I may depend on the means afterwards employed for binding the whole commutator together to hold the pairs of lugs in contact, one with another, to provide electrical connection therebetween. Fig. 10 shows how the bent portions 51 and 52 of the bars 43 and 45 may be crossed if desired to achieve a result slightly different but equally as effective as that shown in Fig. 9. For clearness in description I will hereinafter refer to two commutator lugs that have been assembled as in Figs. 9 or 10 as a commutator segment.

The winding apertures or slots of armature cores vary considerably in contour and proportion, a form much employed being shown in Fig. 11 at 53, 53, etc. The sides of these slots are radial, so obviously the sides of the intervening teeth 54 and 54 are also radial. A slot and a tooth as here shown are, circumferentially, about of equal thickness. Winding units made from wedge shaped stock and formed as in Figs. 9 or 10 are particularly adaptable to slots of this type since a composite commutator segment, composed of a lug 42 and a lug 44, is substantially equal, circumferentially, to a slot 53 and a tooth 54 together, which fulfills a condition required in providing a commutator of substantially the same diameter as the outside diameter of the winding. When however a core is used wherein a slot 53 is thinner, circumferentially, than a tooth 54 the composite commutator segment formed by a lug 42 and a lug 44 will not be as thick as a slot and a tooth together and in such a case I may provide a commutator of a diameter equal in diameter to the winding by inserting a metal shim or pad of uniform thickness between lugs 42 and 44 as at 55 Fig. 12, the pad being cut to an outline substantially as at 49 Fig. 8, or I may provide a commutator of smaller diameter than the winding by modifying the bent portions 51 and 52 Figs. 9 and 10 to locate the commutator segments in a position relatively closer to the armature axis, in which case the pad 55 will be eliminated.

While in the foregoing I have shown and described a wedge shaped bar as an approved type, it is often desirable to use cores having other than wedge shaped slots and at 56, 56, etc. I show slots the sides of which are parallel to each other and wherein conductor bars of rectangular cross section are most suitable, and to provide such conductor bars I may use a length of bar stock of rectangular cross section, and by notching, cutting apart, bending, etc., as previously described, bring it to the form shown in Fig. 13, where a rectangular inner conductor bar 57 extends from a rectangular commutator lug 58, a rectangular outer conductor bar 59 extends from a rectangular lug 60 and a wedge shaped pad 61 added to lugs 58 and 60 provide a suitable composite commutator segment for a commutator of a diameter equal to the diamter of the winding. Instead of using rectangular bar stock in the winding unit shown in Fig. 13 I may punch the parts with the exception of the wedge 61 from flat sheet stock. Wedge 61 may be cut from wedge shaped bar stock preferably to the outline shown at 49, Fig. 8, a cross section through the composite commutator segment being shown in Fig. 14. Instead of using rectangular bar stock or flat sheet and adding a pad of wedge shaped cross section to provide a segment for a commutator as large as the winding, I may use rectangular bar stock or flat sheet and eliminate the wedge shaped pad by slightly modifying the bends at 62 and 63, Fig. 13 to locate the lugs 58 and 60 in a position relatively closer to the armature axis, then by striking said lugs flatwise in a die to bring them to a wedge shape provide therefrom a composite segment suitable for a commutator of smaller diameter than the winding.

Fig. 15 shows an armature core 64 of the type having the sides of the slots and teeth radial, the slots and teeth being, circumferentially, of substantially equal thickness. Assembled in its slots are two of my improved winding units. One unit comprises a commutator lug 42 having an inner conductor bar 43 integrally extending, and a commutator lug 44 having an outer conductor bar 45 integrally extending. The other unit comprises a commutator lug 42$^a$ having an inner conductor bar 43$^a$ integrally extending and a commutator lug 44$^a$ having an outer conductor bar 45$^a$ integrally extending. The lugs 42 and 44 in electrical contact together provide one commutator segment, and the lugs 42$^a$ and 44$^a$ in electrical contact together provide another commutator segment. A spacer 65 of insulating material may separate the two segments. I may further, as in common practice, line the core slots with sheet insulating material, though such linings are not shown in the drawings. While for clearness only two of my winding units are shown entered in the core, it is obvious that an entire winding may be arranged in cylindrical formation and simultaneously endwise entered into the slots of a core in similar manner.

Figure 16:
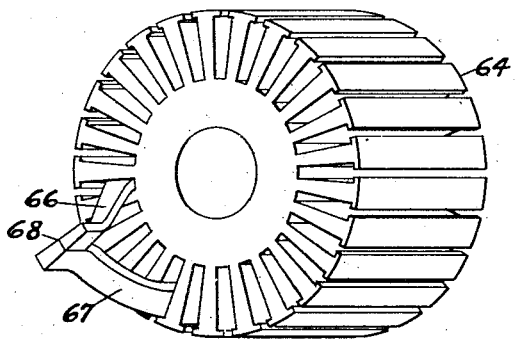
Fig. 16 shows one pair of the straight ends brought together and joined to complete the circuit.

The free ends of the conductor bars 43, 43$^a$, 45 and 45$^a$ extend thru and considerably beyond the core 64 Fig 15 and in Fig. 16 I show how one pair of these free ends are bent as at 66 and 67 and thus brought together as at 68 to be joined to complete the circuit, the manner in which this single pair is joined being typical of the entire winding. The joints may be maintained by brazing, welding, or otherwise, welding being an approved method, and a welded joint is shown at 69 Fig. 17, but while I have here shown and described a method of joining the free ends of my winding units by bending said ends to form pairs as in Fig. 16, it is obvious that the older method of joining these ends with separate end connectors of involute or other form may be employed if so desired.

As the method of stacking a complete set of winding units in cylindrical formation, pressing them simultaneously into the slots of a core, bending them simultaneously to form pairs, and joining the pairs by welding to complete the circuit, or joining the free ends with separate end connectors, is already known to the art, no extensive description thereof is herein contained.

Figure 17:
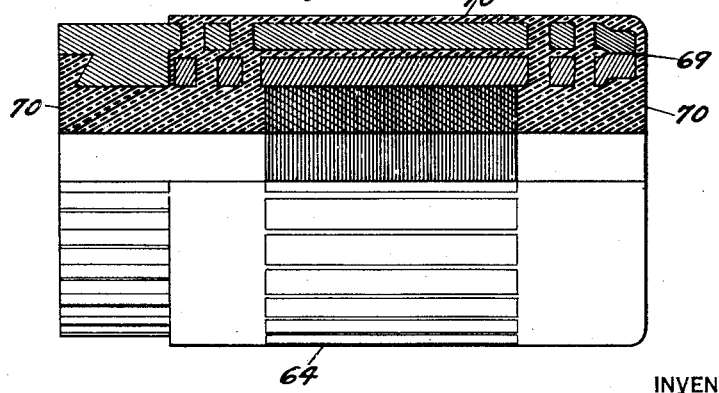
Fig. 17 is a view, partly in section, of a completed armature, insulating material having been moulded through and about the winding to hold it in place and to bind the segments together to compose a commutator.

After a sufficient number of winding units are assembled to provide conductor bars to fill all of the core slots, and commutator lugs sufficient to make the commutator, and after all of the free ends have been bent and joined like the single pair shown in Fig. 16, or joined by separate end connectors, and all have been welded as at 69 Fig. 17, or otherwise joined, the armature may be placed in a mould, and a fluid insulating material poured or pumped into the mould, and hardened or allowed to harden by heat or otherwise to form a solid insulating mass as at 70, 70 etc. to bind the segments together to compose a commutator and to enclose and hold the entire winding in place.

Figure 18:
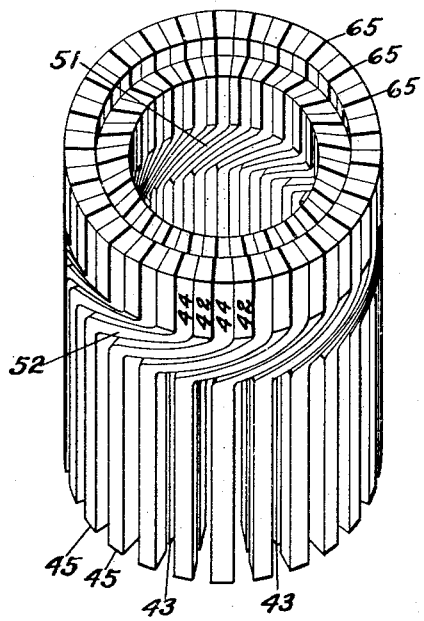
Fig. 18 shows an entire winding assembled in cylindrical formation ready to have a binding means applied to the commutator segments.
Figure 21:
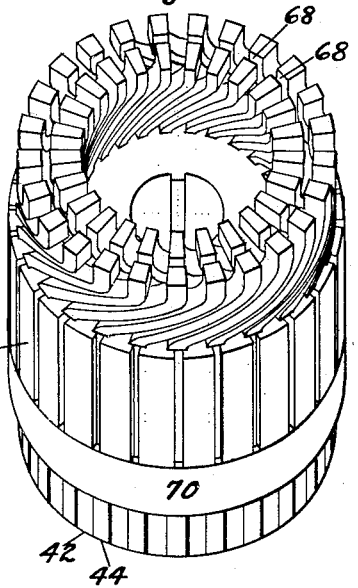
Fig. 21 shows how the free ends of an entire winding are brought together in pairs ready to be welded or otherwise joined to complete the circuit.

Figs. 18 and 21 inclusive show a somewhat different procedure by which a plurality of the winding units shown in Fig. 9 may be assembled with a core to compose a complete armature.

A suitable number of the winding units, each substantially as shown in Fig. 9, are assembled in cylindrical formation as shown in Fig. 8. Insulating spacers, 65, 65 etc. may separate the several commutator segments but must not be placed between any two lugs composing a segment.

After assembly as in Fig. 18, the winding is placed in a mould, the conductor bars 43 and 45, but not the bent portions 51 and 52, having pockets within the mould into which they extend. The mould is then closed, and a fluid insulating material is poured or pumped into the mould and hardened or allowed to harden by heat or otherwise to form a mass of solid insulating material which extends between and surrounds the bent portions 51 and 52 of the bars as at 70, and extends thru the inside of the commutator as at 70ᵃ to engage the notched portions 40 and 40 of the segments to bind the commutator together, leaving the commutator segments exposed at their outer diameter to form a track upon which brushes may bear. Instead of using the spacers of insulating material as at 65, 65 etc. between commutator segments, I may provide metal spacers as part of the mould to extend from the outside of the commutator between the segments a small distance, sufficient only to keep the segments spaced apart. The remainder of the space between segments will then fill with the insulating material when it fills the mould, and, after a mould having such metal spacers is removed, the commutator will have open space between the segments, extending a limited distance from the outside of the commutator bars toward the axis of the commutator. A commutator having such space between segments is known to the art as being undercut, and is considered of great advantage when relatively hard brushes are to be used thereon.

Figure 19:
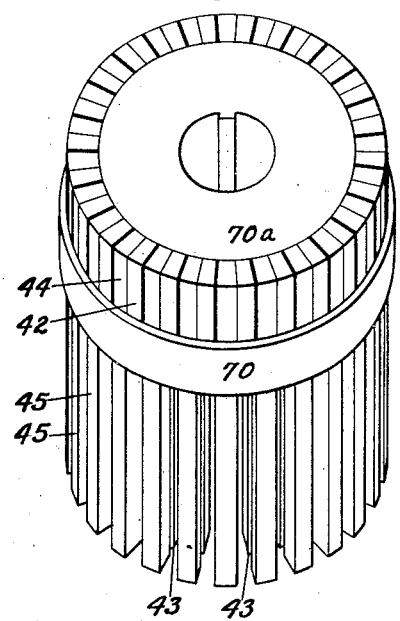
Fig. 19 shows how insulation is moulded about the bars to serve as a binding means so as to provide a commutator having a winding integrally extending.
Figure 20:
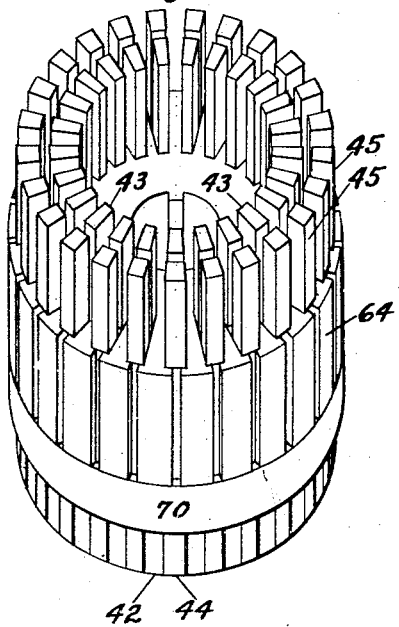
Fig. 20 shows how the structure Fig. 18 may be assembled with a core.

The structure shown in Fig. 19 is substantially a complete commutator having a winding integrally extending therefrom, the conductor bars 43 and 45 of which may be endwise entered thru the slots of a core 64 with the free ends extending considerably beyond the core as shown in Fig. 20, after which the free ends of the bars may be simultaneously bent, the inner bars in one direction and the outer bars in the other direction, to form appropriate pairs as shown at 68 Fig. 21. The pairs may be then joined by brazing, welding, or otherwise, welding being an approved method, a pair so welded being substantially the same as shown at 69 Fig. 17. The welded ends may, if desired, be surrounded by moulded insulation, by placing the structure again in a mould and repeating the moulding process described relative to the commutator end.

Having hereinbefore shown and described details and procedure suitable where the the moulding method is employed to bind the segments together to compose a commutator, I will now show how a variation in detail may be made when I desire to bind the commutator together by the ordinary means usually employed in building commutators of the conventional type. Fig. 22 shows a part of a winding unit having a commutator lug 42 and an inner conductor bar 43 integrally extending. Fig. 23 shows a part of a winding unit having a commutator lug 44 and an outer conductor bar 45 integrally extending. Notches 40 and 41 provide a means upon which a conventional commutator binding means may afterward bear to bind the lugs together to compose a commutator.

The parts Figs. 22 and 23 may be cut from wedge shaped stock as shown in Fig. 24, from rectangular stock as shown in Fig. 25, or they may be punched from flat sheet stock. When the parts are taken from bar stock economy will be effected by cutting the bars somewhat as shown and described relative to Fig. 1, then turning one of them end for end as in Fig. 3. One part is next bent as at 51 Fig. 26, and the other as at 52 Fig. 27, the pair when brought together being similar in arrangement to that shown in Figs. 9 or 10. When wedge shaped stock and a core having slots as shown at 53, 53 etc. Fig. 11 are used together, the composite commutator segment will have a cross section as shown in Fig. 28. When the wedge shaped slots are thinner than the core teeth a pad of the outline shown at 49 Fig. 33 is added to lugs 42 and 44 as at 55 Fig. 29, to provide a composite segment suitable for a commutator of substantially the same diameter as the winding; or, the pad 55 may be eliminated and a composite segment suitable for a commutator smaller than the winding thereby provided. When the cross section of the lugs and conductor bars is rectangular, a composite commutator segment is formed by adding a wedge shaped pad 61, cut to an outline as at 49 Fig. 33, and shown in section between lugs 58 and 60 in Fig. 30, the thickness of the pad determining the diameter of the completed commutator; or, pad 61 may be eliminated by striking the rectangular lugs 58 and 60 flatwise in a die to bring them to a wedge shape, if a commutator of relatively small diameter is desired.

In Figs. 31 and 32 I show a pair of bars for a winding unit wherein I provide notches 40 and 41 suitable to the conventional commutator binding means and yet take said bars from relatively narrow stock such as I show in Fig. 2. If such narrow bar stock is cut apart as in Fig. 1 and notched as at 40 and 41 Figs. 31 and 32, minimum waste is insured.

Fig. 34 shows a plurality of my winding units, each comprising a bar Fig. 26 and a bar Fig. 27 assembled, each commutator segment being composed of a pair of lugs 42 and 44, each lug 42 carrying an inner conductor bar 43, and each lug 44 carrying an outer conductor bar 45, each pair of lugs being in electrical contact one lug with the other to compose one commutator segment. Spacers of insulating material 65, 65 etc. separate one segment from another. For convenience in assembling the various parts I may use a form which will hold them in the arrangement shown until the permanent commutator binding means is applied.

A form of binding means which I may employ for bars as shown in Figs. 26 and 27 is shown in Fig. 35 and consists of a hub 71 undercut as at 72 and threaded as at 73, and a nut 74 undercut as at 75 threaded on the hub, with insulation material 76 and 76 between the hub and nut and the segments. This and other binding means, such as using two washers that are undercut similar to parts 71 and 74, and drawing them together by riveting or spinning a length of tubing running thru them, are not new but are known as common practice in commutator building.

While in the description and drawings I indicate that bars Figs. 22 and 23 are to be bent as in Figs. 26 and 27 prior to the application of the binding means shown in Fig. 35, said binding means may be applied to said bars before they are so bent, and the bending be afterward done to said bars simultaneously if so desired.

After the structure is securely bound together into a commutator having conductor bars integrally extending, the conductor bars are pressed thru the slots of a core 64, with the ends of said bars extending considerably beyond the core as at 43 and 45 Fig. 36. The core slots may first be lined with sheet insulation as in ordinary practice, though no linings are shown in the drawings, or the bars themselves may be covered with insulating material before entry. Fig. 37 shows the projecting ends of the conductors 43 and 45 after they are bent and paired as at 68, each pair being like the single pair shown in Fig. 16, so that they may be joined by welding, brazing, or otherwise to complete the circuit, welding being an approved method.

Other means of pairing and joining the projecting ends may here also be employed, such a means consisting of separate end connectors of involute or other form.

Fig. 38 shows the general appearance of a finished armature wherein the conventional means shown in Fig. 35 has been employed to bind the commutator segments together, the winding units being of the form shown in Figs. 26 and 27. A portion of the armature, for clearness, is shown in section, and a weld joining the open ends of a turn is shown at 69.

While I have herein described successive steps whereby I assemble the various parts to complete an armature as shown in Fig. 38, these steps need not necessarily be taken in the order given, as for instance, the bars may be assembled in cylindrical formation and first entered into the core, then have their free ends bent, joined and welded, and the commutator binding means afterward applied.

In the winding units herein disclosed each inner conductor bar has its own commutator lug and each outer conductor bar has its own commutator lug, the lugs being combined either with or without padding to compose a commutator segment, the separate parts of which are circumferentially adjacent and in electrical contact, and while I have shown and described several methods of arriving at this result, it is to be understood that I do not wish to limit myself to the methods disclosed, as it is possible and practicable to take a length of bar stock of any cross section suitable for a conductor bar of any shape, and upset or forge one end into a commutator lug of the character shown, or to take a length of bar stock of a cross section suitable for a commutator lug of the character disclosed, and forge a portion thereof into a conductor bar and thus produce winding units whereof the conductor bars may fit core slots of shapes greatly different from the commutator segments, or the two parts of Fig. 1 may be cut from a bar of an odd cross section suitable to an odd shaped core slot and the pad or pads used in conjunction with the commutator lugs thus produced may be of such odd cross section as will, when lugs and pads are combined, provide the desired commutator segment, and a pad may consist of one or more layers or parts applied either outside or between the lugs, or all parts of a winding unit may be of laminar structure when advantages to be gained so justify.

Winding units embodying the principle of my invention may be forged, sand cast or die cast to their finished forms and may include units having commutator lugs of one cross section and conductor bars of another, and while the drawings show structures wherein the commutator and winding are of substantially equal diameter, any relative proportion may be had between the two by modifying the bends or leads which extend axially from the core, and while these bends or leads thruout the drawings are of a similar type any form of bend or lead may be employed which will appropriately connect the spaced apart bars comprising a turn without interference or electrical contact of the end connecting portion of one turn with the end connecting portion of another.

Thruout the drawings I show cores having slots of the semiclosed type, but it is obvious that winding units of the character disclosed apply equally to cores having slots that are entirely open or entirely closed.

In the completed armature shown in Fig. 38 considerable open space is left between the leads or end turns and, when space permits, ventilating openings may extend lengthwise thru the core to coact with the bent end turns or leads to provide an air circulating means to keep the armature cool.

Such other variations in form and method as do not depart from the spirit of the invention I aim to cover in the following wherein—

I claim:

1. As a unit of an armature winding, a lug having a conductor bar of one layer of the winding integrally extending therefrom and a lug having a conductor bar of another layer of the winding integrally extending therefrom, said lugs being circumferentially adjacent and in electrical contact to compose a segment of the commutator and having depressions wherein a binding means may extend to hold said commutator together.

2. In an armature, a winding unit comprising a pair of commutator lugs, the one having a conductor bar of the inner layer of the winding integrally extending therefrom, the other having a conductor bar of the outer layer of the winding integrally extending therefrom, the bars being appropriately spread apart to compose a turn of the winding and the lugs being circumferentially adjacent and in electrical contact to form a segment of the commutator.

3. In a bar wound armature, a core having winding apertures, a conductor bar adapted to occupy the outer half of one of said apertures and a conductor bar adapted to occupy the inner half of one of said apertures, an integral lug at the end of the outer bar extending radially inward and an integral lug at the end of the inner bar extending radially outward, and means to hold said lugs circumferentially adjacent and in electrical contact to compose a commutator segment thereof.

4. In a dynamo electric machine armature, a winding unit comprising a pair of wedge shaped commutator lugs, the one having a conductor bar of the outer layer of the winding integrally extending therefrom and the other having a conductor bar of the inner layer of the winding integrally extending therefrom, the bars being spread apart to form a turn of the winding and the lugs being circumferentially adjacent and in electrical contact to compose a segment of the commutator.

5. In a dynamo electric machine armature, a core having winding apertures and a plurality of winding units each having a commutator segment composed of two circumferentially adjacent wedge shaped commutator lugs each substantially the radial height of a core aperture, a conductor bar of substantially the size and contour of the outer half of one of said apertures integrally extending from the outer half of one of said lugs and a conductor bar of substantially the size and contour of the inner half of one of said apertures integrally extending from the inner half of one of said lugs.

6. The combination in a dynamo electric machine armature of a core having wedge shaped slots and winding units each comprising a pair of circumferentially adjacent wedge shaped commutator lugs each substantially the size and contour of one of said slots, the outer half of one of said lugs being extended to form a conductor bar of substantially the size and contour of the outer half of a slot and the inner half of the other lug being extended to form a conductor bar of substantially the size and contour of the inner half of a slot.

7. The combination in a dynamo electric machine armature of a core having a plurality of winding apertures, a plurality of conductor bars in the outer half of said winding apertures, an equal number of conductor bars in the inner half of said winding apertures, the ends of the bars at one end of said core being increased in radial width, the ends of the outer bars being extended radially inward and the ends of the inner bars being extended radially outward, a commutator composed of circumferentially adjacent layers of metal and spacers of insulating material, said spacers being equal in number to the winding apertures and adapted to separate said commutator into segments, each segment containing an inwardly extending end of an outer bar and an outwardly extending end of an inner bar.

8. A winding loop comprising, a commutator segment composed of circumferentially adjacent layers of conductive material, a conductor bar adapted to occupy the outer half of a core slot integrally extending from one of said layers, and a conductor bar adapted to occupy the inner half of a spaced apart core slot integrally extending from another of said layers.

9. A winding loop having a commutator segment composed of circumferentially adjacent layers of conductive material, one of said layers being of a cross section corresponding to a winding aperture for part of its length to provide a layer of the commutator segment, but having its cross section reduced the remainder of its length to correspond to the outer half of a winding aperture to provide a conductor bar of the outer layer of the winding, another layer thereof being of a cross section corresponding to a winding aperture for part of its length to provide a layer of a commutator segment, but having its cross section reduced the remainder of its length to correspond to the inner half of a winding aperture to provide a conductor bar of the inner layer of the winding.

10. As an article of manufacture, a combined commutator and winding for a dynamo electric machine armature, comprising a plurality of electrically separated segments and means whereby said segments are mechanically joined together, each segment being composed of a pair of circumferentially adjacent and electrically joined lugs, each lug having, as an integral part thereof, an extended portion adapted to compose an armature conductor.

11. As an article of manufacture, a combined commutator and winding for a dynamo electric machine armature, comprising a plurality of electrically separated segments and means whereby said segments are mechanically joined together, said segments being composed of circumferentially adjacent layers of conductive material in electrical contact, one layer being of such size and cross section that an integrally extended portion comprising the outer half thereof forms a conductor bar suitable to the outer half of a core slot, another layer being of such size and cross section that an integrally extended portion comprising the inner half thereof forms a conductor bar suitable to the inner half of a core slot.

12. A combined commutator and winding consisting of a plurality of electrically separated segments, each segment being composed of circumferentially adjacent layers of conductive material in electrical contact, one of said layers having integrally extending therefrom a helical lead terminating in an outer layer conductor bar, another of said layers having integrally extending therefrom a helical lead terminating in an inner layer conductor bar, all of said layers having holding notches adapted to be engaged by a commutator binding means, and a ring of insulating material molded to extend into the holding notches and thru and around the helical leads binding the commutator segments together, the conductor bars extending axially from said molded ring.

13. A bar winding for a dynamo electric machine armature comprising a plurality of conductor bars in two concentric layers, integral lugs at the one end of the inner layer bars extending radially outward, integral lugs at the same end of the outer layer bars extending radially inward, means to hold pairs of said lugs side by side in electrical contact to compose commutator segments at the one end of the winding and means to join the opposite ends of the bars in pairs one radially over the other in electrical contact to complete the circuit.

14. A bar winding for a dynamo electric machine armature comprising a plurality of conductor bars in two concentric layers, integral lugs at the one end of the inner layer bars extending radially outward, integral lugs at the same end of the outer layer bars extending radially inward, means to join the opposite ends of the bars in pairs in electrical contact, and a mass of molded insulation extending through and about the structure to cover the winding and to hold said inwardly and said outwardly extending lugs together in pairs to compose a commutator segment of each said pair and a commutator of the said segments.

In testimony whereof, I hereunto set my hand this 27th day of June, 1927.

VINCENT G. APPLE.